US008282467B2

(12) United States Patent
Visocnik et al.

(10) Patent No.: US 8,282,467 B2
(45) Date of Patent: Oct. 9, 2012

(54) TICKET FOR CREDITS FOR GAMING CONSOLE

(75) Inventors: Martin Visocnik, Indooroopilly (AU); Stuart Wills, Drewvale (AU)

(73) Assignee: Novomatic AG, Gumpoldskirchen (AT)

( * ) Notice: Subject to any disclaimer, the term of this patent is extended or adjusted under 35 U.S.C. 154(b) by 814 days.

(21) Appl. No.: 11/921,693

(22) PCT Filed: Jun. 2, 2006

(86) PCT No.: PCT/EP2006/005285
§ 371 (c)(1), (2), (4) Date: Mar. 16, 2009

(87) PCT Pub. No.: WO2006/131274
PCT Pub. Date: Dec. 14, 2006

(65) Prior Publication Data

US 2010/0004052 A1 Jan. 7, 2010

(30) Foreign Application Priority Data

Jun. 6, 2005 (AU) ................................ 2005100474

(51) Int. Cl.
*A63F 13/00* (2006.01)

(52) U.S. Cl. ........................................................ 463/25

(58) Field of Classification Search ............. 463/20–30, 463/42
See application file for complete search history.

(56) References Cited

U.S. PATENT DOCUMENTS

| | | | | |
|---|---|---|---|---|
| 4,636,951 | A * | 1/1987 | Harlick | 463/25 |
| 5,919,091 | A * | 7/1999 | Bell et al. | 463/25 |
| 2003/0162588 | A1* | 8/2003 | Brosnan et al. | 463/25 |
| 2005/0215316 | A1* | 9/2005 | Rowe et al. | 463/29 |
| 2006/0166732 | A1* | 7/2006 | Lechner et al. | 463/25 |

FOREIGN PATENT DOCUMENTS

WO 03/104946 12/2003

* cited by examiner

*Primary Examiner* — Masud Ahmed
(74) *Attorney, Agent, or Firm* — Dilworth & Barrese, LLP.

(57) ABSTRACT

An innovative approach is provided to cashless gaming providing extra security already offered by a gaming console. On a player withdrawing stored credits on a first gaming console, the value of credits are stored in a non-playable account on the first gaming console, while dispensing a ticket with information on the ticket linking the ticket to the non-playable credit account and the stored credit amount. A player may then insert or scan the ticket into a second gaming console which, using information on the ticket, queries the first gaming console to transfer the stored non-playable credits to the second gaming console for the player to continue using the credits.

8 Claims, 4 Drawing Sheets

TICKET FOR CREDITS FOR GAMING CONSOLE

FIELD OF THE INVENTION

The invention relates to the field of gambling and gaming consoles, and in particular to a method of allowing cashless transactions between gaming consoles.

BACKGROUND OF THE INVENTION

Gaming consoles otherwise known as gaming machines, slot machines, poker machines, pokies or EGMs, have proven very popular and for many years have become one of the base elements of the gaming industry. Over the years, there have been many adaptations used in gaming consoles to assist players in transferring money from one gaming console to another without the need for hard currency.

With networks, came a freedom to allow players to remove stored credits to a server for latter access. As the player cashes out, the player is given a ticket worth the amount of credits transferred. To access the credits again, the player merely has to enter the ticket into a new gaming console. The new gaming console will then query the server to confirm the amount of credits to be transferred, and upon confirmation, the server thusly transferred the credits to the new gaming console. This method allows in the quick removal of large amounts of money, without forcing players to wait for a manual pay by an attendant or permitting redemption of odd credits which could not be readily dispensed by a gaming console.

One such application can be found in U.S. Pat. No. 6,752,312 which allows payout by ticket rather than cash, to be remunerated at a latter time by a casino cashier. Alternatively, the same ticket may then be used to enter into another gaming console played by a player. By storing the amount on a server rather than just trusting the amount on a ticket, a certain level of security is obtained, however this in turn opens up other security flaws.

Importantly, the amount of government regulations in most jurisdictions controlling the use of servers for gaming consoles is severely lacking to non-existent. To simply rely on gaming console servers to provide security for all ticket transaction is neglecting the already built in security of gaming consoles themselves which are constructed to withstand excessive manhandling, voltage shocks, power outages, and the like, none of which exist with servers. Additionally, servers rooms generally speaking are fairly accessibly to many casino staff members who in most cases, merely have to log there presence in a log book, if at all. The server in essence is fairly open to attack and or fraudulent use to obtain payout. Further to the server being at direct risk from misuse in manipulating payout, terminals connected to the server itself are even more open for abuse with less security protecting their use. With this in mind, access to servers is increasingly made easier with spyware such as key stroke loggers, online hacking, and various other forms of server tampering.

It is therefore the intention of this invention to alleviate or at the least provide a valid alternative to the problems in the described prior art by providing a secure method of storing player credits for future use. The instant invention will now be described herein in the following embodiments and is not intended to be limited by the scope of the embodiments provided, as other objects, features and advantages of the invention will be apparent from the following detailed disclosure.

SUMMARY OF THE INVENTION

Gaming consoles in contrast to servers provide a much higher level of hardware and software security to servers having their own protocols, fixed game CRC memory checks, data recorded login for access, and a myriad of other security required by law in almost each country they are operated in to prevent taxation fraud and to protect the players interest.

A further added benefit in storing credits in gaming consoles as opposed to servers, is the ability to no longer require servers to be present when storing credits for latter use, as gaming consoles can talk directly to each other via a router, network hub, direct link, or via any other network means where a server is not available to store credit information.

In the first broad form of the disclosed invention, a ticket dispenser means for a first gaming console with said first gaming console having a credit meter for playable credits and storage memory for non-playable credit accounts, and when on a trigger condition at least a portion of said playable credits are transferred to said non-playable account in storage memory to become stored credits on said first gaming console for latter use with said ticket dispenser means dispensing a ticket containing information linking said ticket to said stored credits in said non-playable account on said first gaming console.

Information contained on said ticket would preferably include the value of the amount of credits stored in the account in the first gaming consoles memory, time and date of storage, and any player information where available. The ticket may also include various promotional material where applicable, such as advertising or discounts for various items purchased at the establishment were the ticket was printed. In the preferred embodiment, where a server is also linked to said first gaming console, said information will also be transferred to said server as a secondary backup means, player tracking, and potentially for accounting purposes.

It should be understood that a trigger condition may be any instance or happening that in turn allows for a further happening, such as in a cascade effect. For example, where a player decides to cash out any remaining playable credits, this may be considered a trigger condition. Likewise, where a gaming console awards a player a set number of credits such as from a jackpot, this too may be considered a trigger condition.

Preferably, when storing credits in a gaming console, an account is established in the gaming console memory with non-playable credits, making the credits in the account non-playable until such time the credits are transferred back to a credit meter on a gaming console. The memory where non-playable credits are stored may be flash EPROM memory, a disk drive, or other such memory as known in the art. Created accounts are preferably given a unique identification means such as a number, identification for the gaming console with the new account, the total number of credits stored in the account, and any identification of the player where available.

In a further embodiment, said ticket dispenser means would also be able to receive any dispensed tickets linking said tickets to its respective account, including over networks. A network may be a standard LAN or WAN such as the internet, or some other closed network system used to link multiple gaming consoles as is commonly known in the art. This allows the player to retrieve non-playable stored credits in an account via tickets on a range of gaming consoles in the same establishment, or in other establishments that may be linked by a network. As such it should be understood that a ticket dispenser means may also integrate other components such as a ticket reader, bank note reader or bank note dispenser, and is not limited to simply dispensing tickets. Alternatively, the ticket dispenser, ticket reader, bank note reader, or bank note dispenser may also be separate components or integrated in any possible combination into the ticket dispenser means.

By using the information stored on a ticket, the second gaming console may via a hub, server, or direct link locate the first gaming console with the stored non-playable credits querying the first gaming console as to the validity of the ticket insuring the ticket had not already been used. Where the ticket had not yet been redeemed for credits, the first gaming console will preferably transfer the stored non-playable credits in the Jinked account to the second gaming console, clearing the account linked to the ticket which had been created for the player.

By creating accounts in a stored non-playable account, multiple tickets with varying amounts may easily be dispensed, with no confusion as to the amounts-stored, and to whom the amounts belong as each ticket will have only one account on one gaming machine from which the account was created.

In yet another embodiment of the above disclosed invention, the ticket dispenser means would preferably be adapted to accept bank notes of the country the ticket dispenser means is in use for. For example, where the gaming console is used in Austria, Euros would freely be accepted by the ticket dispenser means and converted to playable credits for the player to be played on the gaming console where the transaction took place. In doing so, the use of tickets or bank notes would be transparent to the player, merely having to use the one device to input money into a gaming console for play, whilst also saving on having to install additional equipment into a gaming console to handle tickets and currency accepting.

It is further contemplated that a server may be used to store any information regarding stored credit values in stored non-playable accounts. By doing so, where a first gaming console is temporarily inactive and a player wishes to use a ticket on a second gaming console, the server may temporarily honour the value of the stored ticket. When the first gaming console becomes active again, the first gaming console will notify the server of its existence with the server simultaneously updating the first gaming consoles non-playable accounts for any used tickets. If a ticket has been used fraudulently by the server whist the first gaming machine is inoperable, the discrepancy may easily be identified as the first gaming machines accounts will not match the information on the server. Further, where a tickets value has been honoured, a log may be used to indicate this happening, drawing attention to the attendant that may have deactivated a gaming console. Suffice to say, numerous protocols can be implemented to hinder or complicate dishonest acts beyond their current ease.

It should be understood that a gaming console may act as a server for other gaming consoles, or inturn each gaming machine may take the roll of a server such as in a ring network setup. Further accounts of one gaming console may be transferred to accounts of another gaming consoles as if the ticket had been printed by the latter gaming console. This would permit replacing machines from the networked gaming consoles.

The present invention will now be described with reference to the following drawings and examples in order to illustrate the disclosure of this invention. The drawings and examples are provided for illustrative purposes and are not intended to limit the scope of the invention described herein.

BRIEF DESCRIPTION OF THE DRAWINGS

The invention will be further described by way of example with reference to the accompanying drawings, in which.

DESCRIPTION OF THE PREFERRED EMBODIMENTS

Figure 1:
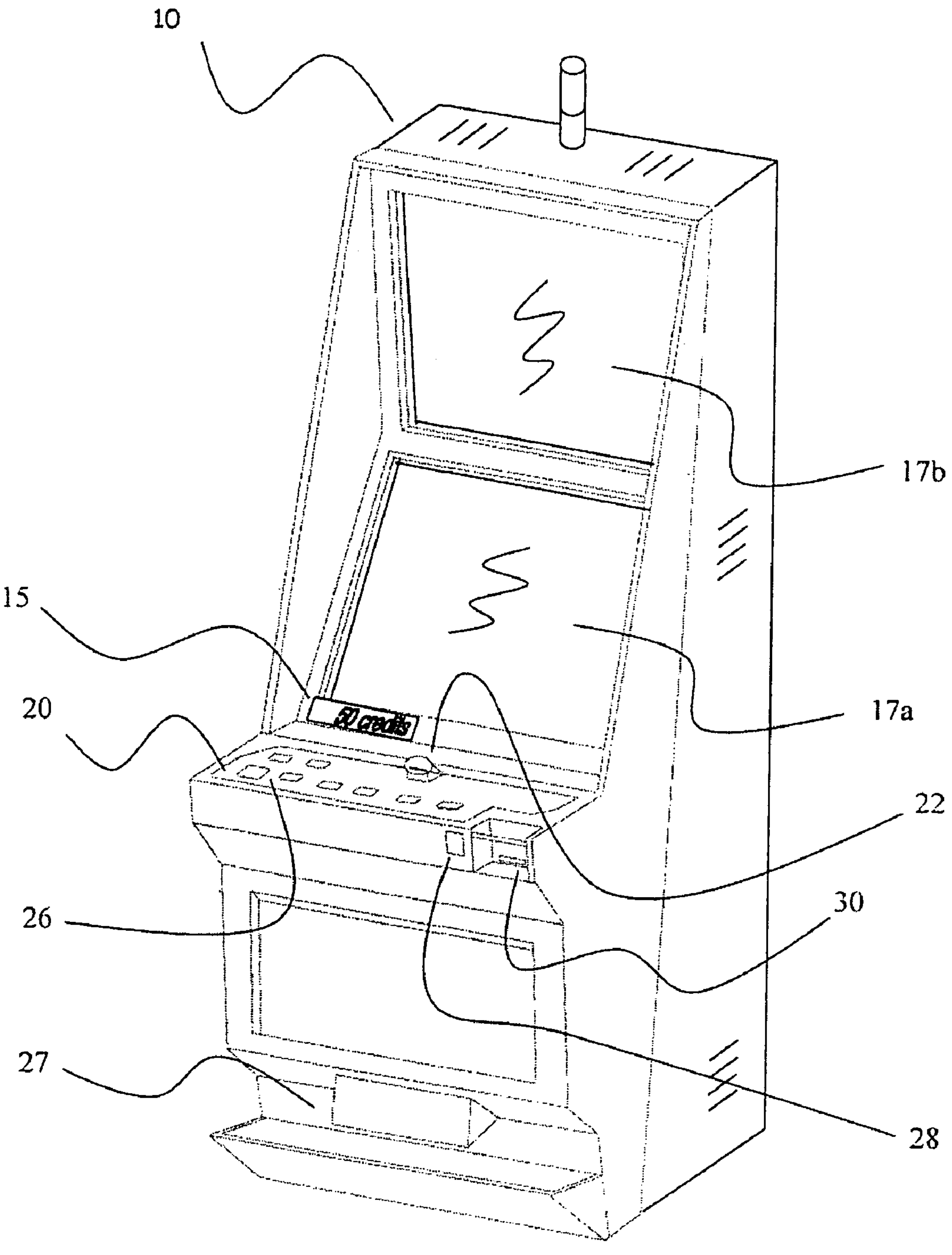
FIG. 1 is a perspective view of a gaming console typically used with a ticket dispenser means.

FIG. 1 depicts one version of a gaming console (10) capable of supporting 2 display means (17*a* and 17*b*). Typically, gaming consoles (10) also include an operating panel (20) on which there is located a coin slot (22), a ticket dispenser means (30), stake selectors (26), credit meter (15) and a game initiator means (28). It should be appreciated that the operating panel (20), coin slot (22), a ticket dispenser means (30), stake selector (26), and game initiation means (28) may individually or as a whole be accessible in a remote location to the gaming console (10), and may include additional controls, input or output devices n as required. In particular, the second display means (17*b*) is in no way essential to the disclosed invention, but merely serves as an example of a potential configuration for a gaming console (10). Further it is intended that the ticket dispenser means (30) is also configured to accept legal tender in the form of bank notes, such as dollars, euros, pounds, and the like where as the coin slot (22) is typically used to receive coinage. Typically, a gaming console also provides an alternative means to dispensing hard currency (27), such as for returning coinage to the player when they cash out any winnings and/or remaining credits.

The game played on a gaming console (10) may be any game commonly found in casinos such as pachinko's, slots, poker, roulette, bingo, lotto, keno, races, or any other game which may be played for money. Further, the credit meter (15) representing credits may be digitised as part of a game being played, or as a component of the gaming console (10) itself. Credits may represent any actual value in currency terms, as for example, one credit may represent one cent or one dollar depending on the configuration and denomination of the gaming consoles (10) settings and the game being played.

Figure 2:
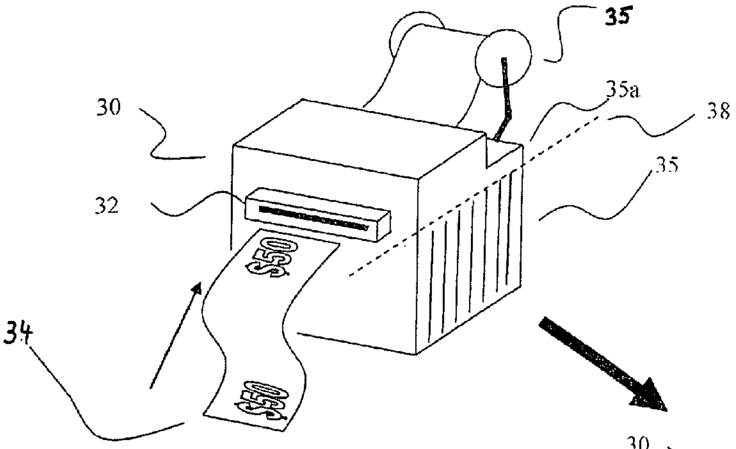
FIG. 2. is a perspective view of a ticket dispenser means used to accept bank notes FIG. 3. is a perspective view of a ticket dispenser means used to dispense a ticket FIG. 4. is a perspective view of a ticket dispenser means used to accept already dispensed tickets FIG. 5. is a model representation of a simple gaming console set up using a ticket dispenser means of FIGS. 2 to 3.

FIG. 2 depicts an example of a ticket dispenser means (30) also configured to accept legal tender in the form of bank note (34), such as dollar bills, Euros, or English pound. In a preferred embodiment, ticket dispenser means (30) would be configured to accept bank notes, converting them to credits to be displayed on a credit meter (15), indicating to the player the amount of credits they may wager on games on a gaming console (10). When affixed to a gaming console (10), the lip (32) of the ticket dispenser means (30) is exposed to the player with the body of the ticket dispenser means (30) being enclosed within the gaming console (10) to provide added security to any bank notes (34) and/or tickets (39) stored within. Once inserted, bank notes (34) are identified for value and authenticity, and are then stored in the lower portion (35) of the ticket dispenser means (30) below the indicated demarcation line (38) and are to be extracted at a latter time.

Figure 3:
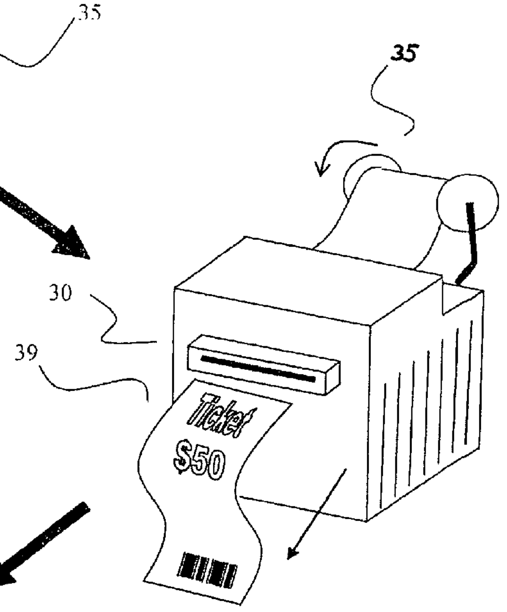
Figure 4:
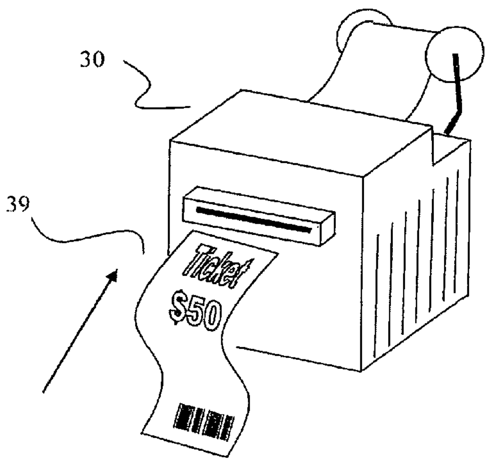

After play, and as show in FIG. 3, a player may elect to withdraw any playable credits from the credit meter (15). When dispensing a ticket (39), a printer roll (35) may be used to print out any account information, delivering the ticket (39)

to the player via the lip (32) used enter bank notes (34) into the ticket dispenser means (30). Printing of ticket (39) information onto tickets (39) in this manner need only rely on similar techniques used when printing standard ticket of dockets as found in cash registers throughout the world. It should be understood that the ticket (39) may also be pre-cut to size and stored in a ticket chamber (not shown) prior to any account information being printed on the ticket (39). The ticket (39) may then be printed and presented to the player via a printing means within the ticket dispenser means (30).

Like wise, as with bank notes (34), tickets (39) may be entered into a ticket dispenser means, (30). Once re-entered into a ticket dispenser means (30), the ticket (39) is stored either separately from any already stored bank notes (34) or collective where separation is unnecessary. Once the ticket (39) has been read by the ticket dispenser means, the information may then be sent to the gaming console (10) with the ticket dispenser means (30) that produced the ticket (39) for interpretation and validation. Any credits validated are then represented on the credit meter (15) for the player to use. Where all the credits in the account have been transferred to the credit meter (15), the account would preferably be deleted to prevent unnecessary space from being taken up.

Figure 5:
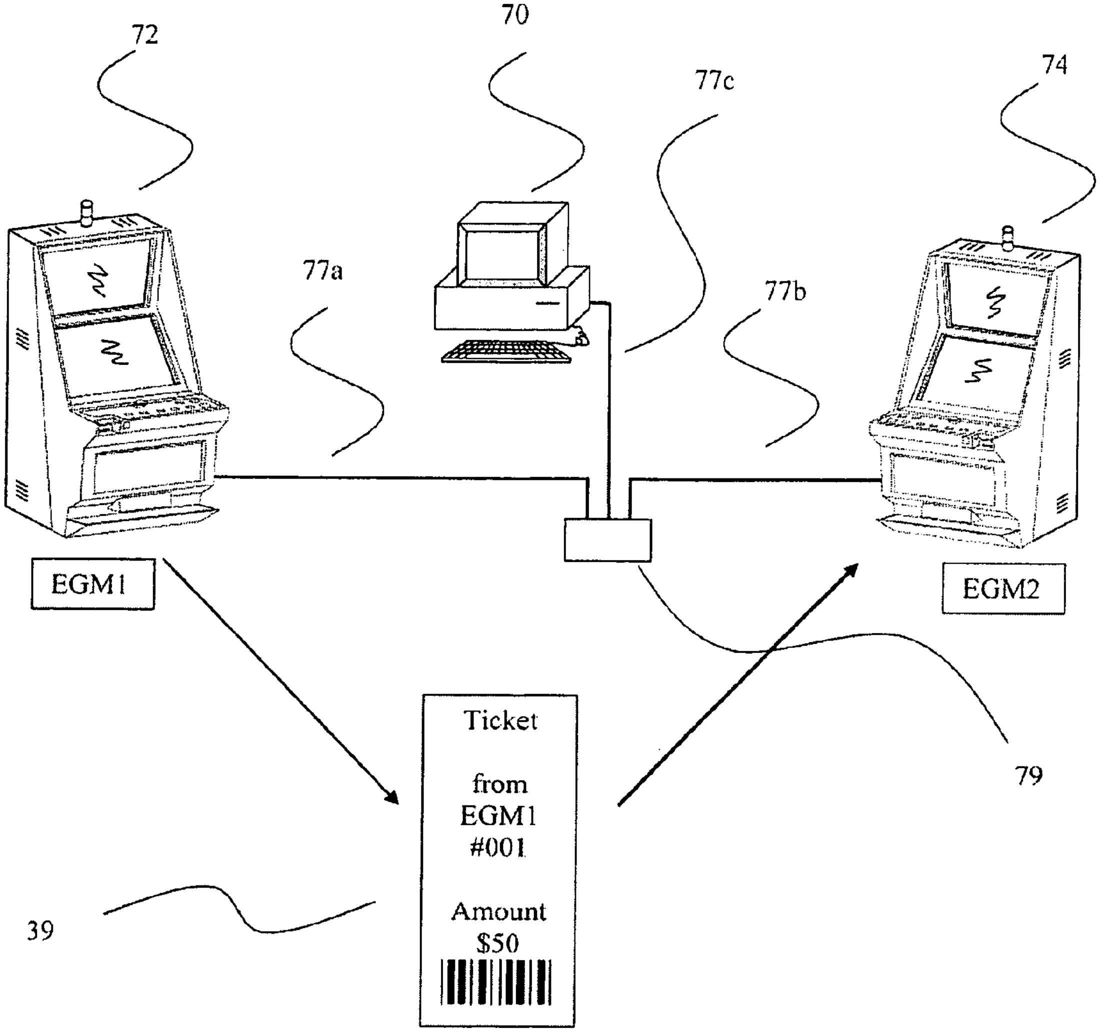

FIG. 5 represents a basic model, with a first gaming console (72) labelled EGM1 of the type described in figure one (10), and a second gaming console (74) labelled EGM2 of the type described in figure one (10), with a server (70) linked by a network (77*a* to 77*c*) composed of a link between each gaming console (72 and 74) though a hub (79) and up to the server (70). A ticket (39) is shown, being dispensed by EGM1 to be deposited in EGM2. It should be understood that a hub (79) simply links the network and should be considered as part of the network, as would other network components such as routers, connectors, or other such devices used to facilitate the sending of signals between gaming consoles (10) and any servers (70) that may be present on the network (77*a* to 77*c*)

Figure 6:
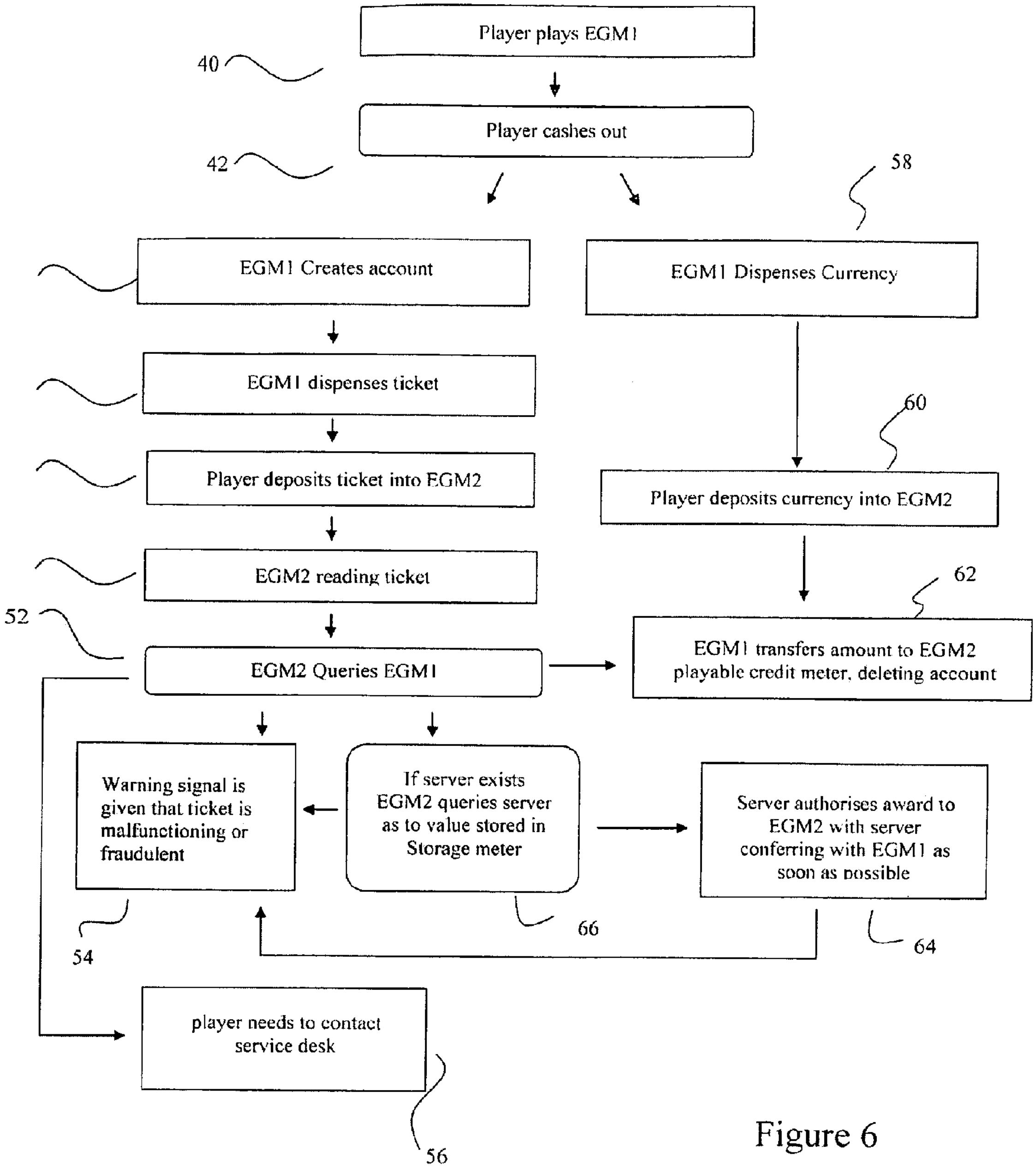
FIG. 6. is a flow chart depicting the use as of gaming consoles and a dispensed ticket

FIG. 6 provides a flow chart of the embodiment provided in FIG. 5, depicting one embodiment of the process required to allow a player to print and use a ticket (39) on a gaming console (10) of the type disclosed herein. It should be understood that a ticket (39) may be printed on a ticket dispenser means (30), or another ticket dispensing device linked to the gaming consoles sharing a common network (77*a* to 77*c*) were the dispensing device has the basic requirements to create and save account information for access by other gaming consoles.

In the first step of the embodiment described in FIG. 6, the player having already begun play on a first gaming console (72), may decide to cash out their remaining credits/winning (42) from the first gaming console (72). This process preferably allows the player to choose either a ticket (39) or legal tender (42). A gaming console (10) may however be configured to be cashless in nature, not requiring this choice and simply dispending a ticket (39).

Where the player chooses legal tender (58), the traditional means of dispensing coinage may be preferred, or where the ticket dispenser means (30) is adapted to do so, bank notes (34) may also be dispensed, with the player is free to deposit the legal tender (62) into additional gaming consoles (10) for continued play, or to depart with their takings.

Where a ticket (39) has been chosen to be dispensed by a first gaming console (72), an account is established (44) in the first gaming consoles (72) memory containing information relating to the amount to be stored from the credit meter (15) of the first gaming console (72) along with detailed information to identify the gaming console (10) which produced the ticket (39). Any particulars regarding the current player which may be known by the first gaming console (72) through the use of any loyalty cards as are commonly used in the art may also be stored for player tracking or for reference if the ticket is lost and needs to be redeemed manually by a cashier. Upon creating an account, a ticket (39) may then be dispensed (44) containing information linking the ticket (39) to the created account on the first gaming console (72). Importantly, certain account details should be represented on the ticket (39) linking the ticket to the created account stored for easy access at a latter date. The account identification means, such as a number, may be unique to the gaming console (10) that produced the ticket (39) thereby also requiring a gaming console identification means as well, or unique to the network (77*a* to 77*c*). By providing an identification number to each gaming console (10), accounts may more readily be found by other gaming consoles. For example, a number much like a static IP address may be assigned to a gaming console (10) so whenever a gaming console (10) is turned off then on-again, the gaming console (10) will retain its identification number.

Where information regarding the account is also stored on a server, the server may be used to direct any inquires as to the account represented on the ticket (39). In addition to information read by a ticket dispenser means (30), other more understandable information to the player may also be printed on the ticket (39), such as the amount in the account on the first gaming console (72), and the casino where the account is stored, the date the ticket was printed, etc. . . .

Information may exist on a ticket (37) in a variety of ways, such as by printed bar code, printed number sequences, printed symbols, magnetic strips, digital chips, or any other means as known in the art. When deposited into a second ticket dispenser means (30), an appropriate reading means would be required to send the read information to the gaming console (10) with the ticket dispenser means reading the ticket (39). For convenience, printed information such as a bar code would be the preferred method of providing information on a ticket (39) as bar codes have been in use for several decades and may be more readily usable by conventional bill acceptors as commonly found in the art.

Once the player has a ticket (39), they may proceed to a second gaming console (74) depositing the ticket (39) into the second gaming console (74) where the tickets (39) contents will be read by a ticket dispenser means (30) for relevant account details (48). Once the correct gaming console (10), in this case the first gaming console (72), holding the account linked to the ticket (39) has been identified, the amount stored in the account will then be transferred to the second gaming console (74) by network (77*a* to 77*c*). To do this, the second gaming console's (74) ticket dispenser means (30) reads the ticket (39) as the ticket is deposited (50) into the second gaming consoles (74) ticket dispenser means (39). At this point, the second gaming console (74) is able to identify the first gaming console (72) as having printed the ticket. The second gaming console (74) may then by the network (77*a* to 77*c*) query (52) the first gaming console (72) as to the validity of the ticket along with any other relevant information such as the tickets worth and its owner. If the ticket has already been used (54) and the first gaming console (72) does not acknowledge the ticket as being valid, a warning signal may be given, either appearing on a linked server (70) or the by the second gaming console (74) display means (17*a* or 17*b*). Alternatively, where a signal in response to a query (52) is not returned by the first gaming console (72) as the first gaming console (72) appears to be inoperable at the time of the query (52) and where a server (70) is present with the required information (66), the server (70) may be configured to authorise the tickets (39) use (64) in accordance with any stored information regarding the tickets (39) account, updating the first gaming console's (72) account details as soon as participle. When the first gaming console (72) comes back on line and the ticket (39) was shown to be for example fake, a warning signal may be given (54) alerting staff to the inconsistence in accounts and any fraudulent behaviour. If a server (70) is not present, instructions may be given to the player to simply cash in the ticket (39) at a service desk (56), which would then manually be verified. As an added security benefit, the server (70) may also keep track of all transactions completed on each gaming console (10) of the network (77*a* to 77*c*) as is currently used by monitoring system in gaming establishments thereby further reducing the possibility of fraudulent activity.

Where no problems have occurred, the first gaming console (72) after being contacted by the second gaming console (74) will transfer the stored credits in its account linked to the ticket (39) to the second gaming consoles (74) playable credit meter (15), preferably deleting the tickets (39) account (62). Alternatively, where the account is permanent, the information in the account will be altered to reflect the use of the ticket (39).

While we have shown and described certain embodiments of the present invention, it should be understood that this invention is subject to many modifications and changes without departing from the spirit and scope of the appended claims.

The invention claimed is:

1. A gaming system comprising a plurality of gaming consoles (72,74), wherein a first gaming console (72) is provided with a credit meter (15) for playable credits, a storage memory for non-playable credits, transfer means for transferring at least a portion of said playable credits to said storage memory storing said transferred credits as non-playable credits, and a ticket dispenser (30) for dispensing a ticket (39) containing information linking said ticket (39) to non-playable credits stored in said memory, a second gaming console (74) is provided with a credit meter (15) for playable credits, a ticket reader for reading said ticket (39) dispensed by said first gaming console (72) and transfer means for transferring non-playable credits stored in the storage memory of the first gaming console (72) to the credit meter (15) of the second gaming console (74) in accordance with the information on the ticket (39) read by the ticket reader of the second gaming console (74), said ticket dispenser (30) is adapted to dispense, when in a trigger condition, the ticket (39) with gaming console identification means for identifying the gaming console (72) dispensing the ticket (39), the gaming console (74) reading the ticket (39) with the ticket reader thereof includes means for identifying the gaming console (72) having printed the ticket (39) based upon said gaming console identification means of the ticket (39) and queries only the identified gaming console (72) as to validity of the ticket (39).

2. A gaming system according to claim 1, further comprising a server being linked by network to said first and second gaming consoles and forming secondary back-up means for storing all non-playable account details of the first gaming console and when first gaming console is not functioning or is unreachable by network by said second gaming console, said server may validate said credit value on said ticket and where said first gaming console is restored to a functioning state, said server being further adapted to update said first gaming consoles non-playable account to reflect said already validated ticket.

3. A gaming system according to claim 1, wherein the second gaming console (74) is provided with a storage memory for non-playable credits, transfer means for transferring at least a portion of the playable credits of the credit meter to the storage memory storing said transferred credits as non-playable credits, and a ticket dispenser for dispensing a ticket containing information linking said ticket to non-playable credits stored in the storage memory of said second gaming console, and the first gaming console (72) includes a ticket reader for reading a ticket dispensed by said first gaming console and transfer means for transferring non-playable credits stored in the storage memory of the second gaming console to the credit meter of the first gaming console in accordance with the information on the ticket dispensed by the second gaming console and read by the ticket reader of the first gaming console.

4. A gaming system according to claim 3, wherein a ticket dispenser of said second gaming console (74) is adapted to receive currency.

5. A gaming system according to claim 1, wherein the dispenser (30) of said first gaming console (72) is adapted to receive currency.

6. A gaming system according to claim 3, wherein the ticket reader of the first gaming console (72) is adapted to read the ticket (39) dispensed by the first gaming console (72) which is adapted to use the information on the ticket (39) to locate non-playable credits in the storage memory of said first gaming console (72), transfer said non-playable credits from said storage memory of said first gaming console to said credit meter (15) of said first gaming console (72) to become playable credits, and remove said non-playable credits from said storage memory of said first gaming console (72).

7. A gaming system according to claim 1, wherein the ticket reader (30) of the second gaming console (74) is adapted to read a ticket (39) dispensed by the second gaming console (74) which is adapted to use the information on the ticket to locate non-playable credits in the storage memory of said first gaming console (72), transfer said non-playable credits from said storage memory of said first gaming console to said credit meter (15) of said first gaming console (72) to become playable credits, and remove said non-playable credits from said storage memory of said first gaming console (72).

8. A gaming system comprising a plurality of gaming consoles (72,74), wherein a first gaming console (72) is provided with a credit meter (15) for playable credits, a storage memory for non-playable credits, transfer means for transferring at least a portion of said playable credits to said storage memory storing said transferred credits as non-playable credits, and a ticket dispenser (30) for dispensing a ticket (39) containing information linking said ticket (39) to non-playable credits stored in said storage memory, a second gaming console (74) is provided with a credit meter (15) for playable credits, a ticket reader for reading said ticket (39) dispensed by said first gaming console (72) and transfer means for transferring non-playable credits stored in the storage memory of the first gaming console (72) to the credit meter (15) of the second gaming console (74) in accordance with the information on the ticket read by the ticket reader of the second gaming console (74), a server (70) linked to the plurality of gaming consoles (72, 74) forms a secondary backup means storing the non-playable credits stored in the gaming consoles (72, 74), said ticket dispenser (30) is configured to dispense, when in a trigger condition, a ticket (39) with gaming console identification means for identifying the gaming console dispensing the ticket (39), the second gaming console is configured to read the ticket (39) with said ticket reader including means for identifying the first gaming console (72) having printed the ticket (39) based upon said gaming console identification means on the ticket (39), said second gaming console, in a first step, queries only the identified gaming console (72) on validity of the ticket (39), in a second step, when a signal in response to said query is not returned by the identified gaming console (72), said server (70) forming said secondary backup means temporarily honors value of the stored ticket (39) as long as the identified gaming console (72) is inactive, when the previously-identified gaming console (72) becomes active again, the server (70) simultaneously updates the identified gaming console non-playable accounts for any used ticket (39), and means are provided for giving a warning signal upon identification of a discrepancy between information on the server (70) and identified gaming console (72).

* * * * *